United States Patent [15] 3,659,276

Gyi [45] Apr. 25, 1972

[54] ANGLE MODULATED WAVE DEMODULATION APPARATUS

[72] Inventor: Maung Gyi, South San Francisco, Calif.

[73] Assignee: Ampex Corporation, Redwood City, Calif.

[22] Filed: July 8, 1970

[21] Appl. No.: 53,295

Related U.S. Application Data

[63] Continuation of Ser. No. 762,569, Sept. 25, 1968, abandoned.

[52] U.S. Cl. ....................................................340/174.1 G
[51] Int. Cl. ....................................................G11b 5/04
[58] Field of Search..........................340/174.1 G, 174.1 H; 179/100.2 MI, 100.2 S; 307/242

[56] References Cited

UNITED STATES PATENTS

| | | | |
|---|---|---|---|
| 3,465,321 | 9/1969 | Reisfeld | 340/174.1 H |
| 3,181,133 | 5/1965 | Seitner | 340/174.1 H |
| 2,972,735 | 2/1961 | Fuller et al. | 340/174.1 H |
| 3,478,255 | 11/1969 | Parker et al. | 340/174.1 H |
| 3,243,580 | 3/1966 | Welsh | 340/174.1 G |
| 3,405,403 | 10/1968 | Jacoby et al. | 340/174.1 G |

*Primary Examiner*—Stanley M. Urynowicz, Jr.
*Assistant Examiner*—Vincent P. Canney
*Attorney*—Robert G. Clay

[57] ABSTRACT

A signal representing the magnetic state transition of an FM wave recorded on magnetic tape gates an astable multivibrator normally locked in one of its conduction states to make successive transition between its quasi-stable conduction states, the number of transitions being inversely proportional to the speed of travel of the tape. A capacitor coupled to the output of the astable multivibrator is charged and discharged to provide a constant energy pulse for each cycle of transitions that the multivibrator makes between its quasi-stable states whereby a train of groups of constant energy pulses are provided by the capacitor. Each group of pulses forming the train of pulses will include one or more constant energy pulses depending upon the tape speed, with the interval between successive pulses of the same group constant and the interval between successive pulse groups varying according to the interval between transitions of the recorded FM wave. The capacitor is coupled to a low pass filter which integrates the train of constant energy pulses and provides the modulation signal carried by the recorded FM wave.

20 Claims, 3 Drawing Figures

INVENTOR
MAUNG GYI
BY Robert G. Clay
ATTORNEY

INVENTOR
MAUNG GYI

BY Robert G. Clay
ATTORNEY

AN ANGLE MODULATED WAVE DEMODULATION APPARATUS

This application is a continuation of copending application Ser. No. 762,569 filed Sept. 25, 1968, now abandoned.

BACKGROUND OF THE INVENTION

In angle modulation, for example, frequency modulation (FM) recording processes, an angle modulated signal is recorded on a magnetic recording medium in the form of magnetic state transitions with varied spacing between successive transitions. The angle modulated signal is demodulated and filtered to remove the carrier and other unwanted frequencies generated in the modulation/demodulation processes and reproduce the modulation signal carried by the recorded wave. A pulse counter discriminator generally is employed to demodulate the recorded wave. Prior art pulse counter discriminators demodulate the recorded wave by providing a pulse each time a transition of the recorded angle modulated wave is detected by a reproduce head. The transition related pulses are coupled to control the charge and discharge of a precision capacitor. The capacitor is charged and discharged to form a single output pulse each time a transition of the recorded wave is detected by the reproduce head. As successive transitions of the recorded wave are detected, a train of output pulses of uniform width are generated. The pulses forming the train are position modulated in accordance with the varied spacing of the transitions of the recorded rectangular wave. The position modulated pulse train is passed through a low pass filter which issues the modulation signal carried by the recorded wave.

Often a recorder and reproducer system is constructed to operate a various selected nominal relative head to magnetic recording medium speeds, with greater selected speeds corresponding to greater system bandwidth capabilities. In such systems, the pulse repetition rate of the transition related pulses reproduced from the recording medium is directly proportional to the frequency of the recorded angle modulated wave and inversely proportional to the nominal head to magnetic recording medium speed during reproduction. Hence, when the relative speed is changed, the repetition rate of the transition related pulses received by the demodulator will change even though the frequency of the recorded angle modulated wave represented by the pulses may remain unchanged. This results in a change in the number of times that the capacitor is is charged and discharged per unit time. A change in the number of times that the capacitor is charged and discharged per unit time causes a change in the capacitor charge per unit time. This causes an undesirable change in the output of the demodulator.

To faithfully reproduce the modulation signal carried by an angle modulated wave at any relative head to magnetic recording medium speed, the output of the demodulator, hence, the charge per unit time of the capacitor, must be the same at all relative speeds for identical recorded waves. Heretofore, it has been the practice to change the value of the capacitor to maintain the proper charge per unit time. This has been accomplished by inserting different capacitors in the demodulator circuit at the different relative speeds of operation.

Unfortunately, changing the capacitor to maintain a constant charge per unit time requires several expensive precision capacitors and numerous switches. Furthermore, the demodulator must be recalibrated for gain, linearity, D.C. drift and frequency offset each time the precision capacitor is changed. Recalibration is time consuming and extremely costly.

Considerable advantages are therefore to be gained by eliminating the necessity of having to recalibrate angle modulated wave demodulator systems such as employed in magnetic recorder playback systems each time the nominal time base of the angle modulated wave is changed as occurs when the relative head to magnetic recording medium speed of a magnetic recorder playback system is changed. The nominal time base of an angle modulated wave is the time base of the wave in absence of modulation. Additional advantages will be realized by the provision of an angle modulated wave demodulator system which requires but a single constant energy pulse forming capacitance for demodulating the angle modulated waves reference to different nominal time bases.

SUMMARY OF THE INVENTION

Accordingly, it is an object of this invention to minimize the cost and to simplify the operation of demodulators useful in the playback system of multiple speed angle modulation recorders.

More particularly, it is an object of this invention to eliminate the necessity of having to recalibrate the demodulator system of multiple speed angle modulation recorders each time the relative head to magnetic recording medium speed is changed.

It is another object of this invention to maintain the proper relationship between the nominal time base or frequency of a received angle modulated wave and the charge per unit time of the constant energy pulse forming capacitance employed in demodulating recorded angle modulated waves for any relative head to magnetic recording medium speed without changing the value of the capacitance.

The present invention relates to systems for demodulating an angle modulated wave. More particularly, it relates to cycle counting demodulators useful in the playback system of multiple speed angle modulation recorders.

Conceptually, the proper demodulator output is obtained at the various selected nominal relative head to magnetic recording medium speeds by generating a different number of constant energy pulses at different selected relative speeds for each magnetic state transition of the recorded wave. The number of constant energy pulses generated for each transition of the recorded wave is inversely proportional to the relative head to magnetic recording medium speed of operation. This maintains the integrated pulse energy per cycle of a given recorded wave the same when operating at different selected nominal relative head to magnetic recording medium speeds. In this manner, the proper demodulator output can be obtained at the various relative speeds without having to change capacitors and, therefore, recalibrate the demodulator, as must be done in the case of prior art angle modulated wave demodulator systems.

To generate the different number of pulses, a unique pulse multiplier is provided. More specifically, an electronic gate means is provided in circuit connection with an astable multivibrator or relaxation circuit. The gate means responds to the pulse to be multiplied and a control or multiplier reference signal by gating the relaxation circuit to make successive transitions between its quasi-stable conduction states. The relaxation circuit provides an output pulse for each cycle of the transitions between its conduction states. Means are provided to terminate the transitions when the number of output pulses correspond to the multiplier reference signal.

Although the aforedescribed pulse multiplier is useful in various situations where it is desired to provide a selected number of pulses from a single pulse, it is particularly suitable for use in the angle modulated wave demodulator system of the present invention.

BRIEF DESCRIPTION OF THE DRAWINGS

The foregoing as well as other objects and advantages will become more apparent upon the consideration of the following detailed description and claims together with the accompanying drawings of which:

DETAILED DESCRIPTION OF THE PREFERRED EMBODIMENT

Figure 1:
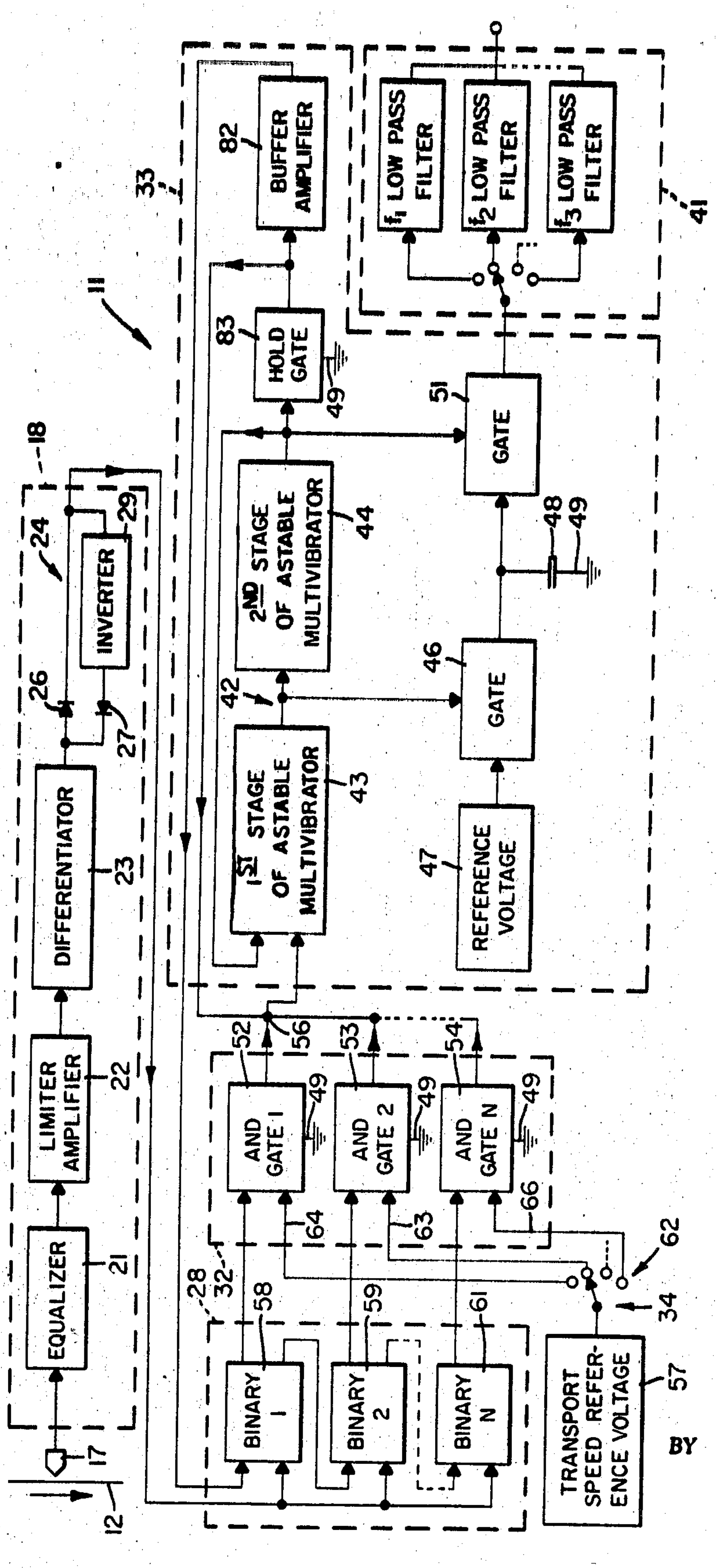
FIG. 1 is a block diagram of one embodiment of the angle modulated wave demodulator system of the present invention.

The angle modulated wave demodulator system 11 of the present invention is illustrated in FIG. 1 as arranged to demodulate an FM type angle modulated wave recorded on a magnetic tape 12. However, the particular form of angle modulation and particular type of magnetic recording medium employed to transmit information do not form a part of the invention but merely serve to illustrate the principles of the invention. For example, the demodulator system 11 could be used to demodulate a phase modulated wave as well as other forms of angle modulated waves received from a magnetic disc, drum or other sources of angle modulated wave.

Typically, the FM waves are recorded on the magnetic tape 12 by recording the times of the transitions between signal levels of the FM waves. The transition times generally are recorded by saturation or bias recording techniques. In saturation recording, the tape 12 is periodically saturated in one or both directions. The times of the transitions coincide with the changes in states of magnetization or the leading and trailing edges 14 and 16 of the rectangular pulses 13 depicting the recorded FM wave.

To reproduce the modulation signal carried by the FM wave, the recorded FM wave 13 is recovered from the tape 12 by a reproduce head 17 and is applied to a trigger pulse generator 18. The pulse generator 18 provides a pulse 19 (See FIG. 2) for each change in state of magnetization of the recorded wave 13 sensed by the reproduce head 17. To eliminate the effects of signal amplitude variation inherent in the recording process and generate a transition related pulse 19 corresponding precisely to the magnetic state transitions of the recorded FM wave, the trigger pulse generator 18 includes an integrating equalizer 21 and limiter-amplifier 22. The equalizer 21 receives the recorded wave from the reproduce head 17 and provides an equalized wave which is severely limited by limiter-amplifier 22 to provide a rectangular wave corresponding to the recorded FM wave. The rectangular wave formed by the limiter-amplifier 22 is coupled to a differentiator 23 which issues a pulse at the edges of the rectangular wave received from the limiter-amplifier 22. In this manner, uniform pulses are generated which are spaced precisely according to the magnetic state transitions of the recorded FM wave 13.

To facilitate the demodulation of the recorded FM wave, means 24 are provided to convert the alternating polarity pulses issued by the differentiator 23 to pulses of the same polarity. In the illustrated embodiment, two oppositely poled steering diodes 26 and 27 are connected in parallel between the output of the differentiator 23 and input of a counter 28. The conduction path including one of the steering diodes 27 has an inverter 29 connected in series with the diode 27 to reverse the polarity of the pulses passed by the diode 27. With the steering diodes 26 and 27 and the inverter 29, the trigger pulse generator 18 provides uniform, identical polarity pulses 19 spaced according to the magnetic state transitions of the recorded FM wave 13.

The pulses 19 are coupled to initiate the generation of a group 30 of "N" constant energy pulses 31 (See FIG. 2) for each magnetic state transition of the recorded FM wave, the number of which is inversely proportional to the nominal relative head to magnetic recording medium or tape 12 speed. At each different S/N relative head to magnetic recording medium speed of operation, a corresponding "N" number of constant energy pulses 31 are generated. "S" is the maximum relative head to magnetic recording medium speed and "N" is an integer equal to unity at the maximum relative speed. More specifically, the pulses 19 are coupled to operate an electronic gate means 32 to gate a pulse generating means 33 enable it to generate the constant energy pulses 31. Means 34 are provided to generate a control signal indicative of the nominal relative head-to-tape speed and of operation couple it to the gate means 32. The control signal maintains the gate means 32 in the proper state to allow the pulse generating means 33 to provide the proper speed related number of constant energy pulses 31.

Figure 3:
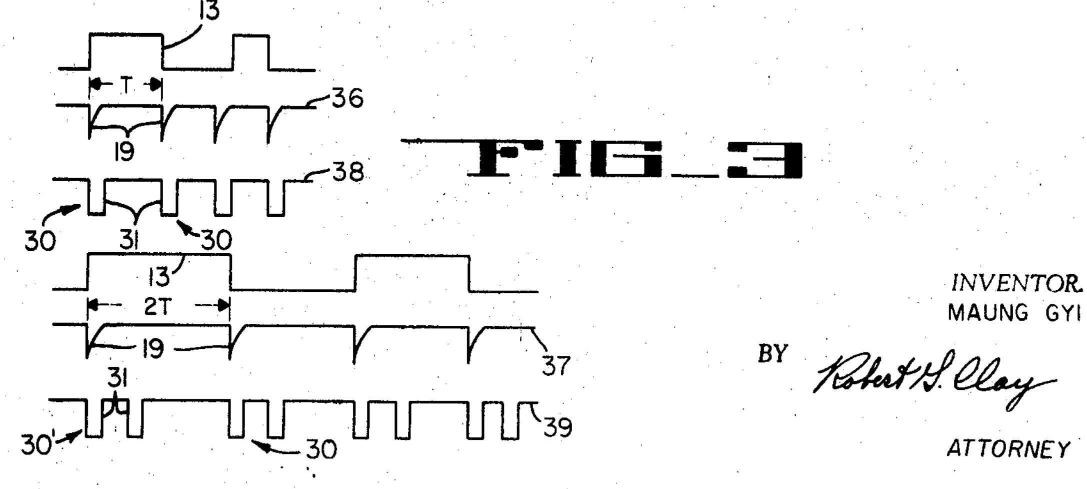
FIG. 3 depicts a recorded angle modulated wave and the magnetic state transition related pulses generated therefrom at two different relative head to magnetic recording medium speeds.

In the illustrated embodiment, the playback system employing the demodulator 11 is arranged to operate with a tape transport system which advances the tape 12 at several discrete speeds which are $1/(2)^{n-1}$ of the maximum tape speed, where "$n$" is an integer which is equal to one at the maximum tape speed. Referring to FIG. 3, when the relative head-to-tape speed is, for example, decreased, the interval between the magnetic state transitions of the recorded FM wave 13, hence the pulses 19, will increase for a given recorded FM wave 13. For the maximum relative head-to-tape speed of "$s$", a train 36 of pulses 19 will be generated having an interval of "$t$" between successive pulses 19. If the relative head-to-tape speed is halved to $s/2$, a train 37 of pulses 19 will be generated having an interval of $2t$ between successive pulses 19. To maintain the integrated pulse energy per magnetic state transition constant at the different relative head-to-tape speeds, hence, the output of the demodulator uniform at the different speeds, the number of constant energy pulses generated per magnetic state transition is increased in proportion to increase in the interval between successive pulses 19, hence, the decrease in the relative head-to-tape speed. This is accomplished by arranging the control signal to set the gate means 32 to gate the pulse generating means 33 to provide a group 30 of $2^{n-1}$ constant energy pulses 31 for each magnetic state transition of the recorded FM wave 13. Hence, at the maximum relative head-to-tape speed "$s$", the pulse generating means 33 is gated to provide a train 38 of groups 30 of constant energy pulses 31, with each group 30 consisting of one pulse 31 generated for a magnetic state transition of the recorded FM wave 13. When the head-to-tape speed is halved to $s/2$, the control signal sets the gate means 32 to gate the pulse generating means 33 to provide a train 39 of groups 30' of constant energy pulses 31, with each group 30' consisting of two identical constant energy pulses 31 per for a magnetic state transition of the recorded FM wave 13. If the relative head-to-tape speed is decreased by other factors of $1/(2)^{n-1}$, the pulse generating means will be caused to issue groups of corresponding $2^{n-1}$ identical constant energy pulses 31 per magnetic state transitions of the recorded FM wave 13. By increasing the number of constant energy pulses 31 as the relative head-to-tape speed is decreased, the integrated pulse energy per axis crossing of the recorded FM wave 13 is maintained constant and, hence, the demodulator output uniform at all relative head-to-tape speeds.

To reproduce the modulation signal carried by the FM wave, the train 38 of constant energy pulses 19 generated by the pulse generating means 33 is passed through an adjustable bandwidth low pass filter 41. At the higher relative head-to-tape speeds, the low pass filter 41 is adjusted to have a larger bandwidth. The low pass filter integrates the train 38 of constant energy pulses 31 to remove the carrier and other unwanted frequencies generated in the modulation and demodulation processes and pass the modulation signal carried by the recorded FM wave 13, hence, the train 38 of pulses 31.

In the illustrated embodiment, the different number of constant energy pulses 31 are generated by employing a unique pulse multiplier circuit formed by the counter 28, the electronic gate means 32 and pulse generating means 33. More specifically, the pulse generating means 33 includes a controlled astable multivibrator 42 having a first stage 43 and a second stage 44. The first stage 43 is connected to operate an electronic gate 46 which is interposed between a voltage source 47 and a precision capacitor 48 referenced to ground 49. The second stage 44 is connected to operate another electronic gate 51 which is interposed between the precision capacitor 48 and the output of the pulse generating means 33. In operation, when the first stage 43 of the astable multivibrator 42 is in the "OFF" or non-conducting state and the second stage 44 is in the "ON" or conducting state, which corresponds to one of the quasi-stable conduction states of the astable multivibrator 42, the gate 46 is closed and the gate 51 is opened. In this circuit condition, the precision capacitor 48 is connected through the gate 46 to the reference voltage source 47 and is charged to the voltage of source 47. When the astable multivibrator stages 43 and 44 switch to the other quasi-stable conducting state, i.e., the first stage 43 "ON" and the second stage "OFF", the gate 46 is opened and the gate 51 is closed. This disconnects the precision capacitor 48 from the voltage source 47 and allows it to discharge through the gate 51 to the output of the pulse generating means 33. As the astable multivibrator 42 makes successive transitions between its quasi-stable conduction states, successive uniform constant energy pulses 31 are generated as the capacitor 48 is repeatedly charged and discharged.

To control the number of constant energy pulses 31 generated by the pulse generating means 33 for each magnetic state transition of the recorded FM wave 13, the gate means 32 is arranged in circuit connection with the first stage 43 of the controlled astable multivibrator 42. The gate means 32 responds to the generation of a pulse 19 to complete the circuit forming the first stage 43, thereby, enabling the astable multivibrator 42 to make successive transitions between quasi-stable conduction states and effect the generation of a group 30 of uniformly spaced constant energy pulses 31. The number of successive transitions that the astable multivibrator 42 makes between quasi-stable conduction states per magnetic state transition, hence, the number of constant energy pulses 31 generated to form a pulse group 30, is determined by a speed related control signal provided by means 34. The speed related signal causes the gate means 32 to interrupt the circuit forming the first stage 43 of the astable multivibrator 42 after the multivibrator has made a predetermined number of transitions between its quasi-stable conduction-states. When the circuit of the first stage 43 is interrupted, the astable multivibrator 42 is disabled and locked in the quasi-stable conduction state having the second stage 44 in the "ON" state. With the first stage 43 normally "OFF" and the second stage 44 normally "ON", the precision capacitor 48 will be charged to the reference potential and be ready to deliver a constant energy pulse 31 when a pulse 19 is generated.

In more detail, the gate means 32 includes a plurality of "AND" gates 52, 53 and 54 connected in parallel fashion to form an "OR" type gating means 32. The number of "AND" gates employed is equal to the number of different relative head-to-tape speeds of operation. The outputs of the "AND" gates 52, 53 and 54 are connected to a common terminal 56 which is in the circuit of the first stage 43 of the astable multivibrator. In one embodiment, NPN transistors formed the active elements of the stages of the astable multivibrator 42, and the common terminal 56 was in the emitter electrode circuit of the transistor of the first stage 43. The "AND" gates 52, 53 and 54 functioned to complete the circuit of the first stage 43 by connecting the emitter circuit of the first stage 43 to ground 49, in response to the generation of a pulse 19 and speed related signal.

The "AND" gates 52, 53 and 54 are controlled by a counter 28 and a transport speed reference voltage source 57. For a demodulator system 11 constructed to operate with a tape transport system which advances the tape 12 at discrete speeds which are $1/(2)^{n-1}$ of the maximum speed, the counter 28 includes a plurality of binaries 58, 59 and 61 connected in the standard fashion to form a binary type counter. The number of binaries employed is equal to the number of different relative head-to-tape speeds of operation. The pulses 19 provided by the trigger pulse generator 18 are coupled to each of the binaries 58, 59 and 61 to insure that the binary counter 28 is reset to zero when the generation of the constant energy pulses 31 is commenced in response to the detection of a magnetic state transition of the recorded wave 13. An output of each of the binaries 58, 59 and 61 is connected to the input of an associated "AND" gate 52,53 and 54 respectively. Upon receiving a pulse 19, each of the binaries 58, 59 and 61 provides a first control signal to the inputs of the associated "AND" gates 52, 53 and 54. A second speed related control signal provided by means 34 including a transport speed reference voltage source 57 which is selectively coupled to the input of one of the "AND" gates by a multiple tapped selector switch 62. The one of the "AND" gates 52, 53 and 54 receiving both control signals simultaneously is gated closed to connect junction 56 to ground 49, thereby, completing the circuit of the first stage 43 of the astable multivibrator 52. As described hereinbefore, this enables the astable multivibrator 42 to make successive transitions between its quasi-stable conduction states whereby a constant energy pulse 31 is generated for each cycle of successive transitions.

The particular one of the "AND" gates 52, 53, and 54 which receives the speed related control signal from the speed reference source 57 depends upon the relative head-to-tape speed of operation. At the highest relative head-to-tape speed, the speed related control signal is coupled to the "AND" gate 52 associated with the first binary 58 of the binary chain forming the counter 28. At the lowest relative speed, the speed related control signal is coupled to the "AND" gate 54 associated with the last binary 61 of the binary chain. The second control signal is coupled to the proper "AND" gate by the selector switch 62 which is operatively associated with the tape speed control mechanism of the tape recorder/reproducer. In the embodiment illustrated in FIG. 1, the selector switch 62 is set to coupled the speed related control signal to the second binary 59. This corresponds to a relative head-to-tape speed of $s/2$ or one-half of the maximum relative speed.

Figure 2:
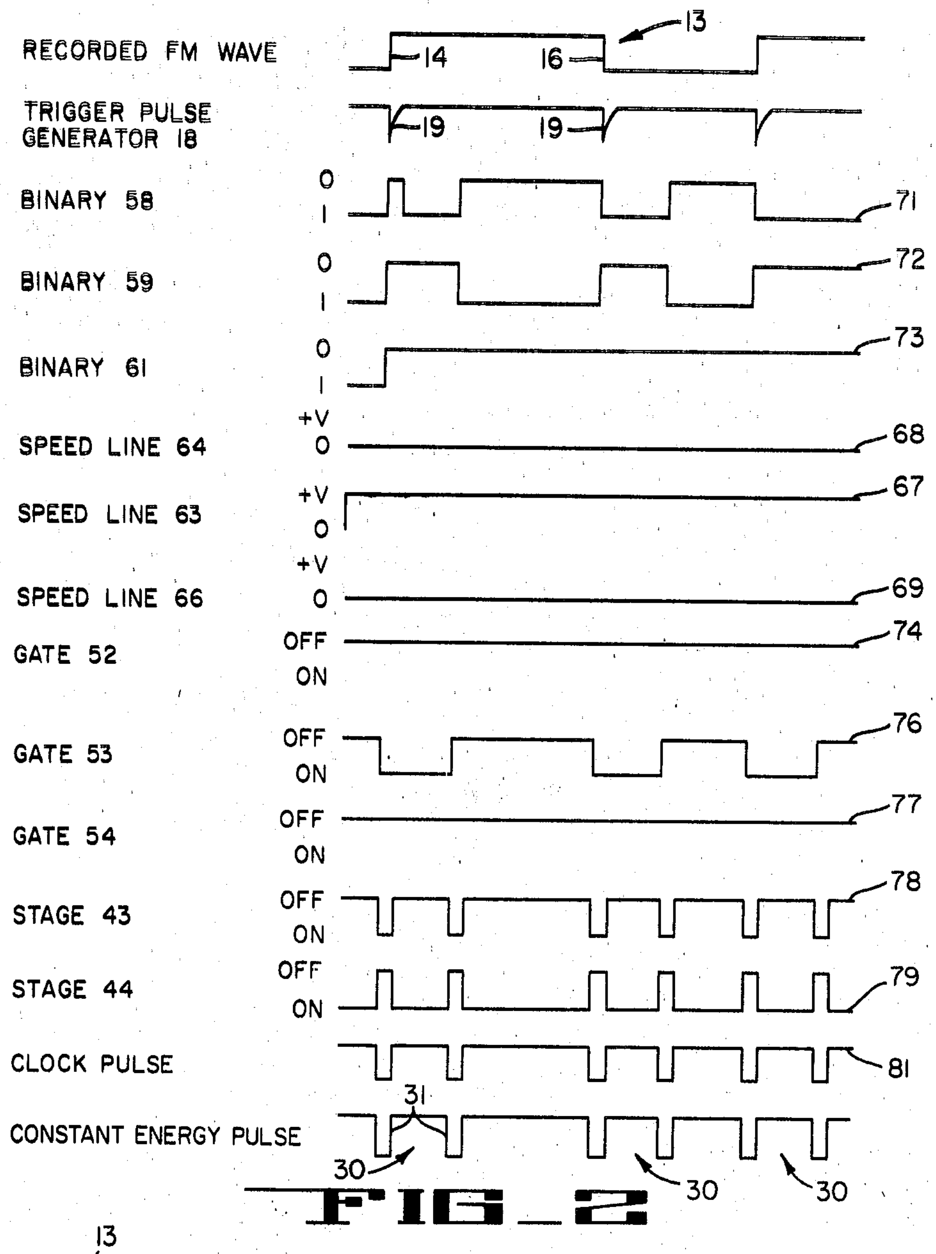
FIG. 2 depicts the waveforms at various points in the demodulator system of FIG. 1.

Referring to FIGS. 1 and 2, the operation of the demodulator system 11 will be described as arranged to reproduce the modulation signal carried by the recorded FM wave 13 recovered from the tape 12 while being advanced by the transport system at a relative head-to-tape speed of $s/2$. In this operating condition, the selector switch 62 is set to connect the reference voltage source 57 to the speed line 63 while disconnecting the source 57 from the other speed lines 64 and 66. This results in a speed related control signal voltage 67 being coupled to the "AND" gate 53 associated with the second binary 59 in the binary chain of the counter 28. Since the speed lines 64 and 66 are not connected to the source 57, a control signal voltage is not present on either of the lines, hence, not at the associated gates 52 and 54. This condition is depicted by graphs 68 and 69 of FIG. 2.

When the reproduce head 17 detects a magnetic state transition such as 14 or 16, of the recorded FM wave 13, the trigger pulse generator 18 issues a pulse 19. The pulse 19 is coupled to the counter 28 and resets the various binaries to zero. This zero reset operation is illustrated graphically by waveforms 71, 72 and 73 of FIG. 2. When a binary is in the zero state, the first control signal is issued to its associated "AND" gate. In the illustrated embodiment, "AND" gated 53 receives both control signals and, thereby, is gated closed to connect ground 49 to the first stage 43 of the astable multivibrator 42. Since the other "AND" gates 52 and 54 do not receive a speed related control signal, they remain open. The operating states of the "AND" gates 52, 53 and 54 are illustrated by graphs 74, 76 and 77 respectively of FIG. 2.

As a result of one of the "AND" gates 53 being closed and connecting ground 49 to the first stage 43 of the astable multivibrator 42, the astable multivibrator 42 commences making successive transitions between its quasi-stable conduction states as illustrated by the waveforms 78 and 79 of FIG. 2. Each time the second stage 44 is switched to the "OFF" state, gate 51 operates to allow the capacitor 48 to discharge and provide the constant energy pulse 31. In addition, a clock pulse 81 is issued by a buffer amplifier 82 operatively associated with the second stage 44. The issued clock pulse 81 is coupled to the input of the first binary 58 of the counter 28. Each clock pulse 81 advances the binary counter 28 one count. As the counter 28 receives successive clock pulses 81, the count in the binary counter 28 is advanced in standard binary fashion by causing various binaries to be set to one and others to be reset to zero. As each binary is set to one, the first control signal received from the counter 28 is removed from its associated "AND" gate.

In the illustrated embodiment, the pulse 19 issued by the trigger pulse generator 18 immediately causes the second stage 44 to be switched "OFF" and the first clock pulse 81 to be coupled to the first binary 58 of the counter 28. The first clock pulse 81 switches the binary 58 to one while leaving the other binaries 59 and 61 at zero and, thereby, removes the first control signal from its associated "AND" gate 52. The inherent delay of the circuit allows the first binary 58 of the counter 28 to be reset to zero before being set to one by the clock pulse 81 received from the astable multivibrator 42. However, since the "AND" gate 53 associated with the second binary remains closed, ground 49 remains connected to the first stage 43 of the astable multivibrator 42. Hence, the astable multivibrator 42 continues to make transitions between its quasi-stable conduction states.

The second time the second stage 44 is switch "OFF", the second clock pulse 81 is coupled to the first binary 58 of the counter 28. This second clock pulse 81 advances the counter 28 another count by simultaneously switching the binary 58 to zero and the binary 59 to one. Since this removes the first control signal from the "AND" gate 53 associated with the second binary 59, the "AND" gate 53 opens and disconnects ground 49 from the circuit of the first stage 48 of the astable multivibrator 42. With ground 49 disconnected from the circuit of the first stage 43, the astable multivibrator 42 is disabled and locked in the stage having its first stage 43 "OFF" and its second stage 44 "ON." This terminates the generation of constant energy pulses 31 until the next pulse 19 is received by the binary counter 28. As successive pulses 19 are received, the astable multivibrator 42 is caused to generate groups 30 of constant energy pulses 31, with the interval between the pulses 31 forming the groups 30 constant and the interval between successive pulse groups 30 varying according to the interval between magnetic state transitions of the recorded FM wave 13.

It should be noted that although "AND" gate 52 receives the first control signal when the counter 28 receives the second clock pulse 81, it does not operate to connect ground 49 to the circuit of the first stage 43 of the astable multivibrator 42. This is because the speed related control signal provided by the transport speed reference source 57 is not connected to the "AND" gates speed line 64.

Since the second stage 44 of the astable multivibrator is switched "OFF" twice in response to the pulse 19 received by the counter 28, the capacitor 48 is discharged twice to provide two constant energy pulses 31. In providing the two constant energy pulses 31 the capacitor 48 functions as a recirculating charge-dispenser. The capacitor 48 is designated a recirculating charge-dispenser because in providing a plurality of constant energy pulses 31 for a single magnetic state transition of the recorded FM wave 13, the capacitor is discharged the plurality of times from the same beginning voltage level to which it is charged after each discharge. By varying the number of times that a single capacitor is charged and discharged per magnetic state transition of the recorded FM wave 13 to maintain a uniform demodulator output as the relative head-to-tape speed is changed, the aforementioned disadvantages associated with changing capacitors to maintain the uniform output are avoided.

In the particular embodiment illustrated, the gate means 32 is shown as operating to disconnect ground 49 from the first stage 43 of the astable multivibrator 42 when the second stage 44 is switched to its "OFF" conduction state as the last of the desired constant energy pulses 31 is generated. To assure that constant energy pulses 31 of uniform pulse width are generated, a hold gate 83 is coupled to connect ground 49 to the common junction 56 during the interval that the second stage 44 of the astable multivibrator 42 is in the "OFF" conduction state. The hold gate 83 is interposed between the second stage 44 and the buffer amplifier 82 to receive an output from the second stage 44 and be gated on to connect ground 49 to the common junction 56 when the second stage 44 is in the "OFF" conduction stage. As long as the second stage 44 remains in the "OFF" conduction state, the hold gate 83 will connect ground 49 to the common junction 56 regardless of whether the gate means 32 connects ground 49 to the junction 56. Hence, the circuit of the first stage 43 of the astable multivibrator 42 will be completed through the hold gate 83 even though the gate means 32 is open. This allows the astable multivibrator 42 to remain in the quasi-stable conduction state having its first stage 43 "ON" and its second stage 44 "OFF" for a period determined solely by the time constant of the circuit elements of the astable multivibrator 42. However, when the astable multivibrator 42 switches quasi-stable conduction states, i.e., the first stage 43 "OFF" and the second stage 44 "ON", the hold gate 83 is opened and ground 49 is thereby disconnected from the common junction 56. If the gate means 32 also is open and, hence, does not connect ground 49 to the common junction 56, the astable multivibrator 42 will be disabled and locked in the conduction state having its first stage 43 "OFF" and its second stage 44 "ON" until the counter 28 receives another axis-crossing pulse 19. Hence, it is seen that the hold gate 83 functions to delay the operation of the gate means 32 in terminating the transitions made by astable multivibrator 42 between its quasi-stable conduction states until the generation of the last constant energy pulse 31 of a particular group 30 is completed.

Because of the operation of the hold gate 83, the conduction state of the second stage 44 of the astable multivibrator 42 will never be switched prematurely to its "ON" state by the operation of the gate means 32. Instead, the hold gate 83 makes certain that the second stage 44 remains "OFF" for a precise period regardless of the operating condition of the gate means 32. In this manner, the constant energy pulses 31 are assured of having a uniform pulse width.

The demodulator system 11 of the present invention has been described and illustrated as arranged to demodulate an FM wave recovered from the tape 12 travelling at a speed corresponding to one-half the maximum relative head-to-tape speed or $s/2$. At other relative speeds, the demodulator system 11 functions in the same manner except different ones of the "AND " gates forming the gate means 32 control the generation of the constant energy pulses 31, a different number of uniformly spaced constant energy pulses 31 are generated per magnetic state transition of the recorded FM wave 13 and the interval between the groups 30 of uniformly spaced constant energy pulses 31 changes. For example, at speeds of less than $s/2$ such as $s/4$ or one-fourth the maximum relative head-to-tape speed, the "AND" gate associated with the third binary of the chain is gated on by the two control signals to connect ground 49 to the first stage 43 of the astable multivibrator. The ground 49 is removed from the circuit of the first stage when the count in the binary counter 28 is advanced four counts. Hence, the astable multivibrator 42 will cycle four times through successive transitions between its quasi-stable stages. This results in the generation of the required four constant energy pulses 31.

In order to provide the proper number of constant energy pulses 31 in the groups 30 forming the pulse train 38 at all of the desired relative head-to-tape speeds of operation, the time constant of the circuit elements of the astable multivibrator 42 is selected so that the period of one cycle of successive transitions is less than the interval between successive magnetic state transitions of highest frequency FM wave to be recorded at the highest relative head-to-tape speed of operation. For example, for processing an FM wave 13 having a carrier frequency of 432 KHz and a modulation frequency which deviates the carrier between 352 KHz and 512 KHz, and which is recorded on tape which is advanced at a relative head-to-tape speed of 120 ips, the time constant of the circuit elements of the astable multivibrator 42 would be selected so that the period of one cycle of successive transitions is less than about 0.3 microseconds.

The demodulator system 11 of the present invention can be arranged to demodulate an FM wave recovered from the tape 12 travelling at various speeds, unrelated to each other or related other than by powers of two. In such cases, it is only necessary to change the association between the counter 28 and gate means 32. For example, if the transport system is arranged to advance the tape 12 at several discrete speeds which are related by powers of a number other than two, e.g., three, or $1/(3)^{n-1}$ of the maximum tape speed, the counter 28 would be changed to count to the base three. In such a case, every ternary of the chain forming the ternary counter would be coupled to operate one of the "AND" gates 52, 53 and 54 in the manner described with respect to the binary counter.

The tape 12 may be advanced at several discrete speeds which are not related by powers of a particular number. In such cases, the counter 28 would remove the first control signal from the gate means 32 every $2n$ transition made by the astable multivibrator between its quasi-stable conduction states after the generation of an axis-crossing pulse 19. For example, if the transport system is constructed to advance the tape 12 at the maximum as well as ½, 1/5 and 1/10 of the maximum relative head-to-tape speeds, the counter 28 would be arranged to remove the first control signals from the "AND" gates of the gate means 32 on the first, fourth, tenth, or twentieth transition made by the astable multivibrator 42 after the generation of pulse 19. This would result in the generation of a group 30 of either one, two, five or 10 constant energy pulses per magnetic state transition of the recorded FM wave 13 depending on the relative head-to-tape speed of operation.

As described hereinbefore, the counter 28, gate means 32, and the pulse generating means 33 function together as a pulse multiplier. For each input pulse, such as received from the trigger pulse generator 18, the pulse generating means 33 provides pulses the number of which is determined by the operation of the gate means 32 as controlled by a multiplier reference signal such as received from source 57. As employed in an angle modulation demodulator, the pulse multiplier circuit may be used in many applications other than in the demodulator portion of a recorder playback system.

From the foregoing description, it is seen that the demodulator system of the present invention obviates having to recalibrate multiple speed angle modulation recorder playback systems each time the relative head to magnetic recording medium speed is changed by employing a novel pulse multiplier which requires but a single precision pulse forming capacitor. While the demodulator system of the present invention has been described with respect to a single embodiment, numerous modifications and variations are possible without departing from the scope of the invention. Hence, the present invention is not to be limited except by the terms of the following claims.

What is claimed is: wave, wave which

1. Apparatus for demodulating received angle modulated waves in the form of transitions between signal levels and referenced to different nominal time bases comprising means for generating control signals representative of the nominal time base of the received angle modulated wave a pulse generator for providing constant energy output pulses, and means responsive to the control signals and the transitions of the received angle modulated wave to actuate the pulse generator to provide a selected number of constant energy pulses for each transition of the received angle modulated wave which selected number is proportional to the nominal time base of the received angle modulated wave.

2. The apparatus according to claim 1 wherein said actuating means includes a counter, said counter is responsive to each transition of the received angle modulated wave to be readied to count, said counter coupled to said pulse generator to have its count advanced each time a constant energy pulse is generated, said counter and control signal generating means coupled in operative association to actuate said pulse generator to terminate the generation of said constant energy pulses after the count of said counter corresponds to the generation of said selected number of constant energy pulses.

3. The apparatus according to claim 1 wherein said pulse generator provides a train of successive groups of at least one constant energy pulse in response to successive transitions of the received angle modulated wave with the interval between successive groups equal to the interval between successive transitions and the interval between successive constant energy pulses forming each group constant.

4. The apparatus according to claim 1 wherein the actuating means includes an enabling means and a disabling means, said enabling means responsive to the control signals and each transition of the received angle modulated wave to enable the pulse generator to generate constant energy pulses, said disabling means responsive to the control signals and the generation of the selected number of constant energy pulses to disable the pulse generator and terminate the generation of constant energy pulses.

5. The apparatus according to claim 1 wherein said pulse generator comprises an astable multivibrator coupled to said actuating means to make successive transitions between its quasi-stable conduction states when actuated by said actuating means, a capacitor, and means responsive to said astable multivibrator to charge said capacitor while said astable multivibrator is in a first of its quasi-stable conduction states and to discharge said capacitor while in a second of its quasi-stable conduction states to thereby form a constant energy pulse as said astable multivibrator makes successive transitions between its quasi-stable conduction states; and said actuating means includes an electronic gate means coupled to said astable multivibrator to gate it to make successive transitions between its quasi-stable conduction states in response to each transition of the received angle modulated wave and to lock it in one of its quasi-stable conduction states thereby terminating the transitions between its quasi-stable conduction states in response to said control signals after said selected number of constant energy pulses have been generated.

6. The apparatus according to claim 5 wherein said actuating means includes a counter, said counter is responsive to each transition of the received angle modulated wave to be readied to count, said counter is coupled to said astable multivibrator to have its count advanced each time a constant energy pulse is generated, and said counter is coupled to actuate said gate means to lock said astable multivibrator in said first of its quasi-stable conduction states after the count of said counter corresponds to the generation of said selected number of constant energy pulses.

7. The apparatus according to claim 6 wherein said gate means comprises a plurality of "AND" gate means each having an input and an output, the input of each "AND" gate means is coupled to said counter to respond to a selected count in said counter different from the counts to which the other "AND" gate means respond, the input of each of said "AND" gate means is coupled to said control signal generating means so that a different one of said "AND" gate means receives said control signal for each of the different nominal time bases, said outputs of said "AND" gate means are coupled in circuit connection with one of the two stages of said astable multivibrator to gate it to make successive transitions between its quasi-stable conduction states in response to said counter being readied to count by a transition of the received angle modulated wave and one of said "AND" gate means receiving said control signal and to lock it in said first of its quasi-stable conduction states in response to the counter reaching the selected count controlling the " AND" gate means receiving said control signal thereby terminating the transitions made by said astable multivibrator between its quasi-stable conduction states after said selected number of constant energy pulses have been generated.

8. The apparatus according to claim 7 wherein the outputs of said "AND" gate means are coupled in circuit connection with said one of the two astable multivibrator stages to complete the astable multivibrator circuit and gate it to make successive transitions between quasi-stable conduction states in response to said counter being readied to count and one of said "AND" gate means receiving said control signal and to interrupt the astable multivibrator circuit and lock it in said first of its quasi-stable conduction states in response to said counter reaching said selected count, and said charging and discharging means responsive to said astable multivibrator to charge said capacitor while said astable multivibrator is locked in said first of its quasi-stable conduction states and to discharge said capacitor while in said second of its quasi-stable conduction states.

9. The apparatus according to claim 8 further comprising means responsive to said astable multivibrator to delay the interruption of said astable multivibrator circuit in response to said counter reaching said selected count until said multivibrator is in said first of its quasi-stable conduction states after said counter reaches said selected count.

10. The apparatus according to claim 9 wherein said delay means includes means independent of said "AND" gate means responsive to said astable multivibrator when in said second of its quasi-stable conduction states to complete the astable multivibrator circuit while it is in said second of its quasi-stable conduction states.

11. In a multiple speed angle modulation demodulator including a reproduce head for detecting the magnetic state transitions of an angle modulated wave recorded on a magnetic recording medium while the reproduce head and recording medium are relatively transported at a nominal speed, means responsive to the reproduce head for generating a pulse each time the reproduce head detects a magnetic state transition forming the recorded angle modulated wave, and an adjustable filter means coupled to receive said pulses and provide the modulation signal carried by the angle modulated wave, WHEREIN THE IMPROVEMENT COMPRISES; means for generating control signals representative of the nominal relative head to magnetic recording medium speed, a pulse generator for providing constant energy pulses, and means responsive to said control signals and transition pulses to actuate said pulse generator to provide a selected number of constant energy pulses for each generation of a transition pulse which number is inversely proportional to the nominal relative head to magnetic recording medium speed.

12. The apparatus according to claim 11 wherein the actuating means includes an enabling means and a disabling means, said enabling means responsive to the control signals and each transition pulse to enable the pulse generator to generate constant energy pulses, said disabling means responsive to the control signals and the generation of the selected number of constant energy pulses to disable the pulse generator and terminate the generation of constant energy pulses.

13. The apparatus according to claim 11 wherein said reproduce head and magnetic recording medium are transported relative to each other at any one of a plurality of nominal relative head to magnetic recording medium speeds given by the equation S/N where S is the maximum nominal relative speed and N is an integer which is unity at the maximum nominal relative speed, and said actuating means is responsive to said control signals and transition pulses to actuate said pulse generator to generate "N" constant energy pulses for each generation of a transition pulse.

14. The apparatus according to claim 11 wherein said actuating means includes a counter, said counter is responsive to the transition pulse to be readied to count, said counter coupled to said pulse generator to have its count advanced each time a constant energy pulse is generated, said counter and control signal generating means coupled in operative association to actuate said pulse generator to terminate the generation of said constant energy pulses after the count of said counter corresponds to the generation of said selected number of constant energy pulses.

15. The apparatus according to claim 14 further comprising means responsive to said pulse generator to delay the termination of the generation of constant energy pulses until the selected number constant energy output pulse is provided after said counter reaches the selected count.

16. The apparatus according to claim 14 wherein said actuating means includes a plurality of "AND" gate means each having an input and an output, the input of each "AND" gate means is coupled to said counter to respond to a selected count in said counter different from the counts to which the other "AND" gate means respond, the input of each of said "AND" gate means is coupled to said control signal generating means so that a different one of said "AND" gate means receives said control signal for each of the different nominal relative head to magnetic recording medium speeds of operation, said outputs of said "AND" gate means are coupled to said pulse generator to actuate it to provide constant energy pulses in response to said counter being readied to count by the generation of a transition pulse and one of said "AND" gate means receiving said control signal and to terminate the generation of constant energy pulses in response to the counter reaching the selected count controlling the "AND" gate means receiving the control signal.

17. The apparatus according to claim 16 wherein said reproduce head and magnetic recording medium are transported relative to each other at any one of a plurality of nominal relative head to magnetic recording medium speeds given by the equation $s/(2)^{n-1}$ where $s$ is defined as the maximum nominal relative head to magnetic recording medium speed and $n$ is an integer which is one at said maximum relative speed, said counter is a binary counter having "$n$" binaries arranged to form a binary chain, and said gate means comprises "$n$" "AND" gate means, the input of different ones of said "$n$" "AND" gate means coupled to different ones of said binaries so that a different "AND" gate means responds to said counter to effect termination of the generation of the constant energy pulses when said counter reaches said selected one of said $2^{n-1}$ counts.

18. A pulse multiplier for generating a predetermined number of identical output pulses from a single input pulse comprising a relaxation circuit, a plurality of gate means each having an input and an output, said outputs of said gate means coupled in circuit connection with said relaxation circuit to prevent it from making transitions between its quasi-stable conduction states in the absence of selected signals at the input of one of said gate means, a counter coupled to receive said input pulse and be readied to count, and means for generating a multiplier control selected signal, said multiplier control selected signal coupled selectively to the input of one of said gate means, the inputs of each of said gate means coupled to receive a second selected signal from said counter in response to said counter receiving said input pulse, said gate means receiving both selected signals gated to allow said relaxation circuit to make successive transitions between its quasi-stable conduction states and generate an output pulse for each cycle of transitions between quasi-stable conduction states, said counter coupled to said relaxation circuit to have its count advanced each time an output pulse is generated and remove said second selected signal from said gated gate means when its count corresponds to the predetermined number of output pulses that are to be generated whereby said relaxation circuit is prevented from making transitions between its quasi-stable conduction states.

19. The pulse multiplier according to claim 18 wherein the relaxation circuit is an astable multivibrator having first and second stages, the gate means are connected in circuit with one of the stages of said astable multivibrator to lock it in one of its quasi-stable conduction states in the absence of selected signals at the input of one of said gate means, and said gate means receiving both selected signals gated to complete the astable multivibrator circuit and allow it to make successive transitions between its quasi-stable conduction states.

20. The pulse multiplier according to claim 19 wherein said gated gate means is responsive to said counter when its count corresponds to the predetermined number of output pulses that are to be generated to interrupt the astable multivibrator circuit and lock it in said one of its quasi-stable conduction states, and further comprising means responsive to said astable multivibrator to delay the interruption of said astable multivibrator circuit until said multivibrator is in the said one of its quasi-stable conduction states after said counter reaches said count corresponding to said predetermined number.

* * * * *